(12) United States Patent
Kurth et al.

(10) Patent No.: US 11,218,858 B2
(45) Date of Patent: Jan. 4, 2022

(54) METHOD FOR PREDICTIVE RECEPTION OF PHYSICAL LAYER DOWNLINK REPETITIONS IN A NB-IOT UE FOR PROLONGED BATTERY LIFETIME

(71) Applicant: SHENZHEN GOODIX TECHNOLOGY CO., LTD., Shenzhen (CN)

(72) Inventors: Mathias Kurth, Dresden (DE); Chethan Venkatesan, Dresden (DE)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 16 days.

(21) Appl. No.: 16/848,862

(22) Filed: Apr. 15, 2020

(65) Prior Publication Data

US 2020/0245118 A1 Jul. 30, 2020

Related U.S. Application Data

(63) Continuation of application No. PCT/CN2019/098238, filed on Jul. 29, 2019.

(30) Foreign Application Priority Data

Aug. 16, 2018 (EP) .................................... 18189303

(51) Int. Cl.
*H04W 4/80* (2018.01)
*H04W 72/04* (2009.01)
(Continued)

(52) U.S. Cl.
CPC ............. *H04W 4/80* (2018.02); *H04L 1/0013* (2013.01); *H04L 1/189* (2013.01); *H04L 1/203* (2013.01);
(Continued)

(58) Field of Classification Search
CPC . H04W 4/80; H04W 72/042; H04W 72/0446; H04L 1/0013; H04L 1/189; H04L 1/203
(Continued)

(56) References Cited

U.S. PATENT DOCUMENTS 10,783,602 B1* 9/2020 Reed ...................... G06T 1/0028
2013/0286904 A1* 10/2013 Xu ......................... H04L 1/0027
370/280

(Continued)

FOREIGN PATENT DOCUMENTS

| CN | 105659511 A | 6/2016 |
| CN | 106664167 A | 5/2017 |

(Continued)

OTHER PUBLICATIONS

3GPP TR 23.720 V1.3.0( Feb. 2016)—3rd Generation Partnership Project; Technical Specification Group Services and System Aspects; Architecture enhancements for Cellular Internet of Things.
(Continued)

*Primary Examiner* — Faisal Choudhury
(74) *Attorney, Agent, or Firm* — J.C. Patents (57) ABSTRACT

The disclosure discloses a method for predictive reception of physical layer downlink repetitions in NB-IoT UE. The object of the disclosure to find a method that prolongs the battery lifetime of IoT devices will be achieved by a method for predictive reception of physical layer downlink repetitions in NB-IoT devices, the method comprising the following steps: estimating an expected number of repeated sub-frames required for a successful reception of a current encoded and in sub-frames rate-matched downlink transmission from a base station to an IoT device by applying a redundancy estimation function, using the estimated expected number of repeated sub-frames as input of a repetition reception control function, where a feedback-loop (Continued)

between the redundancy estimation function and the repetition reception control function is used for refining and adapting the predictive reception of physical layer downlink repetitions in NB-IoT.

16 Claims, 4 Drawing Sheets

(51) Int. Cl.
    *H04L 1/00*        (2006.01)
    *H04L 1/18*        (2006.01)
    *H04L 1/20*        (2006.01)

(52) U.S. Cl.
    CPC ..... *H04W 72/042* (2013.01); *H04W 72/0446* (2013.01)

(58) Field of Classification Search
    USPC .......................................... 370/329
    See application file for complete search history.

(56) References Cited

U.S. PATENT DOCUMENTS

| | | | |
|---|---|---|---|
| 2017/0294999 A1* | 10/2017 | Patel | H04W 72/04 |
| 2020/0083991 A1* | 3/2020 | Nader | H04L 1/1864 |
| 2021/0195457 A1* | 6/2021 | Kim | H04L 5/0023 |

FOREIGN PATENT DOCUMENTS

| | | |
|---|---|---|
| JP | 2017-123624 A | 7/2017 |
| WO | WO2017121708 A1 | 7/2017 |

OTHER PUBLICATIONS

Extended Search Report for the prior application No. 18189303.3.
Antipolis, Sophia, "Considerations in NB-PDSCH" 3GPP TSG RAN WG1 Ad-hoc Meeting; RI-161878; (Mar. 2016).
The International Search Report of corresponding International application No. PCT/CN2019/098238, dated Oct. 24, 2019.

\* cited by examiner

METHOD FOR PREDICTIVE RECEPTION OF PHYSICAL LAYER DOWNLINK REPETITIONS IN A NB-IOT UE FOR PROLONGED BATTERY LIFETIME

CROSS-REFERENCE TO RELATED APPLICATIONS

This application is a continuation of International Application No. PCT/CN2019/098238, filed on Jul. 29, 2019, which claims priority to European Patent application No. 18189303.3, filed on Aug. 16, 2018, both of which are hereby incorporated by reference in their entireties.

TECHNICAL FIELD

The disclosure discloses a method for predictive reception of physical layer downlink repetitions in NarrowB and Internet-of-things UE.

BACKGROUND

NarrowBand Internet-of-Things (NB-IoT) is a recently ratified 3GPP standard for the radio interface between a base station (eNodeB) and user equipment (UE). The objectives of the standard are power efficient transport of infrequent small data with battery lifetimes of up to 10 years, extension of the cellular coverage, the support of a large number of devices within a cell as well as low complex devices with low costs (see 3GPP TS 23.720 Study on architecture enhancements for Cellular Internet of Things).

The deployment and mobility characteristics of IoT devices are much more diverse compared to mobile phones and, thus, the requirements in terms of cellular coverage are higher. When a smart-phone loses the network connectivity in a basement, tunnel or other signal-challenging location, it creates the inconvenience for the user to move out of this place to reacquire the signal. For an IoT device deployed in such a signal-challenging location, this results in a permanent service outage.

NB-IoT addresses these requirements by allowing for the reuse of the existing cellular network infrastructure in order to benefit from the already existing density of cellular network deployments. In addition, NB-IoT enhances the link budget by an additional 20 dB margin compared to Long Term Evolution (LTE), Wideband Code Division Multiple Access (WCDMA) or General Packet Radio Service (GPRS) to achieve a maximum coupling loss (MCL) of 164 dB.

NB-IoT approaches the MCL of 164 dB by reducing the system bandwidth to 200 kHz in downlink and up to 3.75 kHz in the uplink. In addition, the standard introduces repetitions of the physical layer signal in both uplink and downlink. They allow symbol-level chase combining at the receiver. Symbol-level chase combining means accumulation of repeated soft-bits in a buffer before passing the combined soft-bits to the decoder. The repetition is complementary to the (code rate 1/3) convolutional coding within the physical layer processing chain that is applied before. Since convolutional coding has higher coding gain than repetition coding, the NB-IoT base station first allocates more redundancy within the convolutional code before starting to increase the number of repetitions. As the number of repetitions increases, the code rate decreases and hence, the transmission becomes reliable.

As a characteristic traffic pattern, an IoT device generally generates small amounts of data in an infrequent fashion, either periodically or triggered by external events. At that time, the device becomes active (enters connected mode) and reports the data to the network. In contrast to LTE, NB-IoT does not define closed-loop link adaptation based on channel state feedback towards the base station. Since the communication session between an IoT device's modem and network are supposed to be short, a conservative open-loop estimation of the link quality at the base station side has been considered sufficient. On the other hand, this also means that the block error rate (BLER) operating point can be expected to be more conservative, i.e. the base station would provide more redundancy than required in order to account for estimation errors as well as to outweigh the lower frequency diversity due to the reduced system bandwidth. The block error rate (BLER) operating point is understood as the required signal-to-noise-ratio (SNR) in the decoder at which the probability of miss-detection is acceptable. Signal-to-noise-ratio is directly proportional to the redundancy.

In the NB-IoT downlink channels, both convolutional coding and repetition coding are concatenated serially. Convolutional coding is an error correction mechanism which introduces redundant bits by linearly combining the contents of shift registers fed with information bits. Repetition coding is an error correction coding technique which introduces redundancy by repeating the information bits several times. Within the downlink processing chain, the bits of the MAC PDU (transport block, meaning the Protocol Data Unit of Medium Access Control Layer) are CRC attached and encoded with a rate 1/3 convolutional code and, thereafter, the encoded bits are rate-matched according to the resource assignment (also called "rate matched block"). CRC means "cyclic redundancy check" and is an error-detecting code commonly used in digital networks and storage devices to detect accidental changes to raw data. Blocks of data entering these systems get a short check value attached, based on the remainder of a polynomial division of their contents. On retrieval, the calculation is repeated and, in the event the check values do not match, corrective action can be taken against data corruption. CRCs are so called because the check (data verification) value is a redundancy (it expands the message without adding information) and the algorithm is based on cyclic codes.

The "rate matching" describes a procedure where the base code rate of the used code (in general 1/3) is adapted to the desired amount of redundancy, i.e. the level of protection of the transmitted signal. Furthermore, rate matching is used to adapt the encoder output bit stream to the number of available resources given by the structure of the transmitted signal in a fine-granular fashion. During the rate matching procedure, individual bits are either repeated or omitted while assembling the output bit stream, to get a higher or lower amount of redundancy, respectively. On receiver side, so called de-rate matching involves combination of bits that have been repeatedly transmitted or filling of bit positions that have been omitted in the actual transmission with zero information. The rate matched block contains a checksum and is self-decodable.

In the further processing, the rate matched block is scrambled, modulated, precoded and mapped to a defined number of sub-frames between one and ten. Hereby, the "scrambling" describes a procedure where a locally generated pseudo-random bit sequence is applied to an input bit stream by a bit-wise xor-operation. This improves the statistics of the transmitted signal since long sequences of '0' or '1' are avoided. Furthermore, interference from or to other transmission links becomes more noise-like, improving the ability to cope with such interferences during decoding.

In FIG. 1a, an example is shown with a mapping of the rate matched block onto 3 sub-frames without repetitions.

The rate matched block is input to the repetition coding as shown in FIG. 1b. As discussed in ([R1-161878]—Considerations in NB-PDSCH), the repetition is applied in cycles as a compromise to allow for symbol-level chase combining as well as early termination. Within a cycle, a sub-frame from the rate matched block is repeated up to four times before the next sub-frame from the rate matched block is processed. After each cycle, all sub-frames from the rate matched block have been received and the modem of the IoT device can attempt to decode and verify the checksum. In that case, early termination refers to the event that the rate matched block could be decoded before all repetition cycles have been received.

Figure 1:
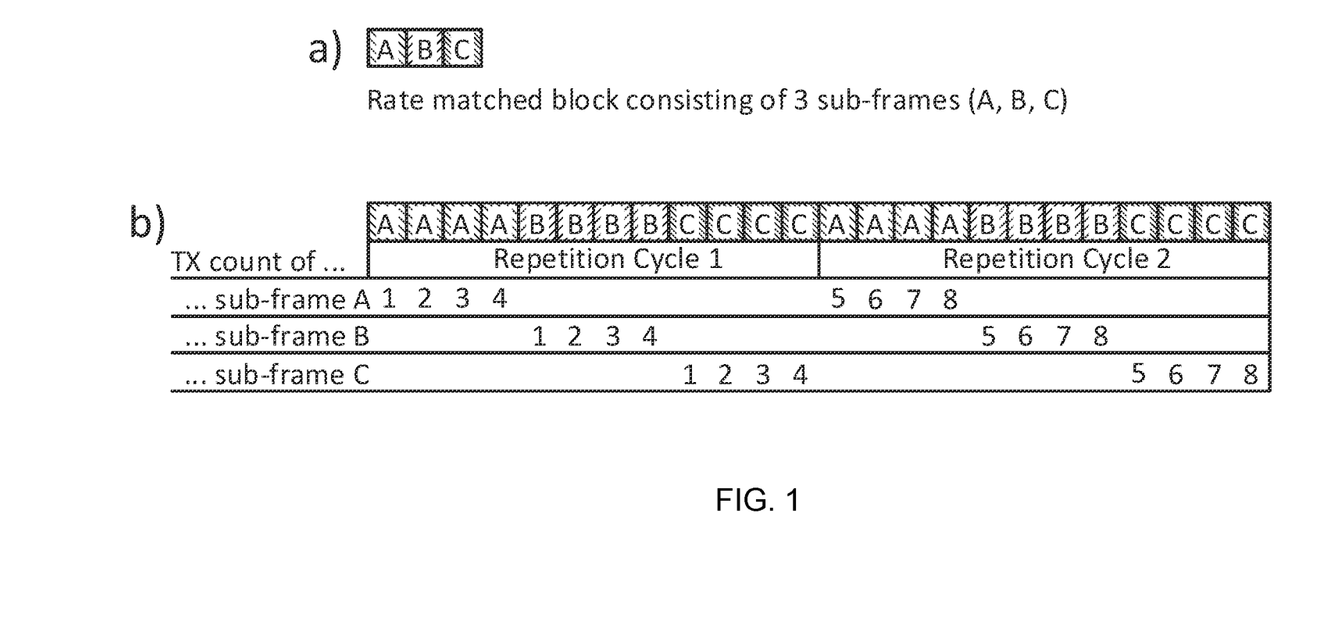
FIG. 1 Repetition pattern in NB-IoT NPDSCH (state-of-the-art)
Figure 2:
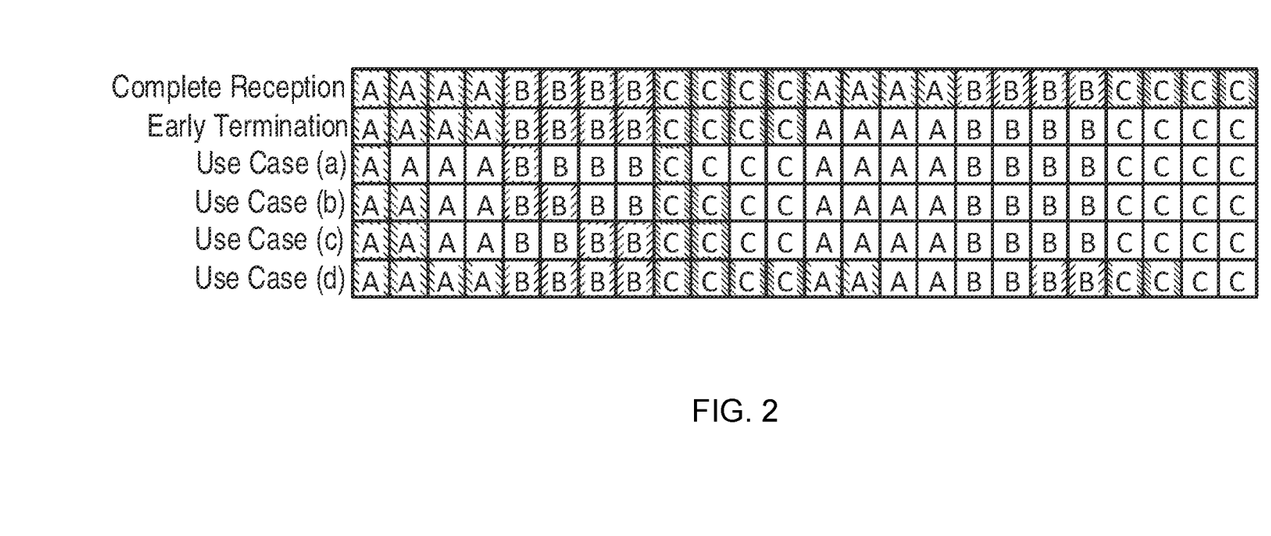
FIG. 2 Predictive repetition reception vs. early termination (state-of-the-art) and use cases (a) to (d) using the inventive method.

In the use case—reception of repetition in good channel conditions—the downlink NB-IoT physical downlink shared channel (NPDSCH) reception is shown in FIG. 1. An IoT device's modem not implementing early termination would have to receive all 24 sub-frames as shown in FIG. 2. It can be expected that the base station is conservative in the allocation of redundancy due to the missing channel state feedback as well as the narrow system bandwidth. Thus, in good channel conditions, the number of received sub-frames could be reduced to 12 with early termination as shown in FIG. 2. Any further reduction of sub-frames to be received is not possible with state-of-the-art approaches.

SUMMARY

It is therefore an object of the disclosure to find a method that makes it possible to obtain necessary predictions about the receptions of repetitions of data transmitted on the physical layer in order to prolong the battery lifetime of IoT devices and thus extend the life period of NB-IoT devices.

The object of the disclosure will be achieved by a method for predictive reception of physical layer downlink repetitions in NarrowBand Internet-of-things devices, the method including the following steps:

estimating an expected number of repeated sub-frames required for a successful reception of a current encoded and in sub-frames rate-matched downlink transmission from a base station to an IoT device by applying a redundancy estimation function, whereas the redundancy estimation function uses a downlink control information (DCI-Format N1), which is transmitted in Narrowband Physical Downlink Control Channel (NPDCCH) from the base station to the user equipment, using the estimated expected number of repeated sub-frames as input of a repetition reception control function, whereas the repetition reception control function schedules and postpones the repetition reception and a decoding attempt of the downlink transmission to a point in time where an expected success probability is reached according to the redundancy estimation function, where a feedback-loop between the redundancy estimation function and the repetition reception control function is used for refining and adapting the predictive reception of physical layer downlink repetitions in NB-IoT. The inventive method is performed by the NB-IoT modem.

The rationale of predictive reception is to decide upon the required repetitions to be received based on an estimation of the redundancy (code rate) to successfully decode the rate matched block. In other words, the predictive reception favors incremental redundancy over repetition in case the overall redundancy signaled by the network provides sufficient margin by taking advantage of the higher coding gain of convolutional code over repetition code.

The power consumption of the modem can be reduced over state-of-the-art approaches by estimating the redundancy (number of sub-frame repetitions) required for successful reception. By controlling the reception of specific sub-frames, power consumption can be reduced even further.

In the sense of this disclosure the downlink transmission includes all data that should be transmitted from a base station to a NB-IoT device over the Narrowband physical downlink shared channel (NPDSCH), whereas the NPDCCH indicates for which NB-IoT device there is data in the NPDSCH, where to find them and how often they are repeated. Finally, additional information like paging or system information update is contained in the NPDCCH as well.

An expected success probability is the mean probability of successfully decoding a transport block.

A decoding attempt in the sense of this disclosure means an attempt to decode descrambled, demodulated and convolutional encoded soft bits to obtain the transport block with the original data that should be transmitted.

In an embodiment of the inventive method, the downlink control information Format N1 includes information about a downlink resource assignment and repetition number. The DCI Format N1 is used to indicate the downlink scheduling information for the user equipment. A repetition number refers to the 3-bit field in downlink control information (DCI) Format N1 indicating the number of repetitions of the rate matched block.

In a further embodiment of the inventive method, the redundancy estimation function has full access to the NB-IoT device's operational state, especially retrieving current and past channel states, soft-buffer state, which is represented by log likelihood ratios (LLR).

The redundancy estimation function is based on observations of the wireless channel as well as the downlink resource assignment. The redundancy estimation function determines the required redundancy to successfully receive the current downlink transmission.

Figure 3:
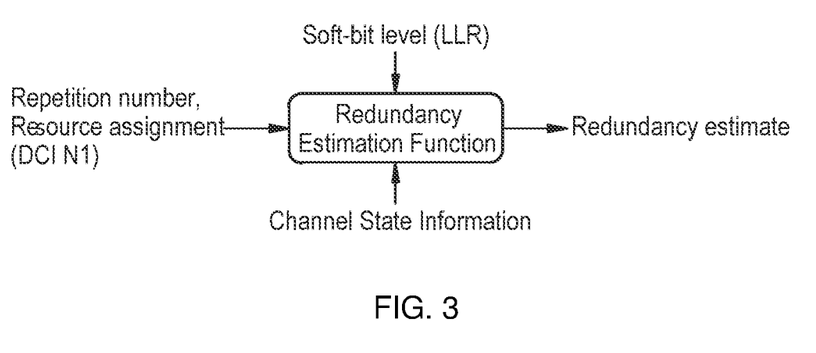
FIG. 3 Inventive redundancy estimation function.

Hence, the purpose of the redundancy estimation function is the estimation of the required level of redundancy to successfully receive a unicast NPDSCH transmission. Input into this function is the information about the downlink resource assignment and repetition number in the form of downlink control information (DCI Format N1) which is received in Narrowband Physical Downlink Control Channel (NPDCCH). Furthermore, the function has full access to the modem operational state, e.g. it might retrieve current and past channel state (as determined by the modem, which is part of the NB-IoT device) as well as soft-buffer state represented by log likelihood ratios (LLR). LLRs represent the reliability of the soft-bits. The function outputs the expected number of repeated sub-frames to be received for a successful decoding of the NPDSCH. The inputs and output of the redundancy estimation function is illustrated in FIG. 3.

Without limiting the scope of the disclosure, two examples for the redundancy estimation functions for the sake of illustration will be presented in the following.

In a first exemplary embodiment, the redundancy estimation function is realized in an open-loop fashion. An open-loop fashion means that the required level of redundancy for successful decoding is estimated before the decoder without the feedback from the decoder.

In the open-loop fashion the NB-IoT device uses the received sub-frames from the base station and narrowband reference symbols (NRS) for estimation of a signal to interference and noise ratio (SINR), whereas the estimated SINR and a target code rate from the DCI is used to determine the required number of repeated sub-frames.

The redundancy estimation can be realized in an open-loop fashion using channel quality estimation of the radio communication channel, which is the transmission medium. There are several methods to estimate the channel quality. A method followed in this document is based on estimating the signal-to-interference and noise ratio (SINR) using NRS that is known to the UE. In that case, the modem of the NB-IoT device is using the narrowband reference symbols (NRS) for estimation of the signal to interference and noise ratio (SINR). Using the estimated SINR as well as the target code rate from the DCI, a table-lookup based approach can be employed to determine the required number of repetitions (see also: Ahmadi, "LTE-Advanced, A Practical Systems Approach to Understanding the 3GPP LTE Releases 10 and 11 Radio Access Technologies", Elsevier, 2014, ISBN: 978-0-12-405162-1.) The open-loop approach has low complexity and the output is available already within the decoding process.

In a second exemplary embodiment, the redundancy estimation function is realized in a closed-loop fashion. A closed-loop fashion means that the required level of redundancy is estimated after the decoding process is finished by using the soft-bit output from the decoder as a feedback.

In closed-loop fashion the UE uses a soft-bit output of its soft-buffer as an input of the redundancy estimation function, whereas a LLR evaluator of the redundancy estimation function evaluates the soft-bit output and maps it to a corresponding block error rate (BLER). A LLR evaluator is a function that estimates the signal level from the log-likelihood ratios (LLRs) of each bit, estimates the bit error rate (BER) and using a look-up table (LUT), maps BER to a corresponding block error rate (BLER) for a given block size. A block error rate is defined as the ratio of a number of erroneous decoded blocks to the total number of transmitted blocks.

Within the closed-loop function, the soft-bit output of the receiver is used as the input. The closed-loop redundancy estimation function's LLR evaluator evaluates the soft-bit output from the decoder and maps it to a corresponding block error rate (BLER) (see also: Ahmadi, "LTE-Advanced, A Practical Systems Approach to Understanding the 3GPP LTE Releases 10 and 11 Radio Access Technologies", Elsevier, 2014, ISBN: 978-0-12-405162-1.). Based on the estimated block error rate, the function decides upon the additional number of repetitions to receive for each sub-frame of the rate matched block. The output of the closed-loop approach is available later; however, the estimation quality is higher.

In a further embodiment of the inventive method, the open-loop and closed-loop redundancy estimation function can be combined to a hybrid approach.

In another preferred embodiment of the inventive method, for the repetition reception control function a threshold value is pre-defined, at which a first decoding attempt is made.

The repetition reception control function acts upon the input of the redundancy estimation function and collects the required number of repetitions of each sub-frame of the rate matched block. Furthermore, it schedules decoding attempts and collects further redundancy in case of unsuccessful decoding.

With predictive reception of repetitions, a degree of freedom arises in the scheduling of repetitions to be received, since only a sub-set of all repetitions is required. The repetition reception control function schedules the repetition reception in an efficient manner based on the input of the redundancy estimation function to minimize the RF reprogramming actions. There is a feedback loop between both functions to incrementally refine and adapt.

Furthermore, the repetition reception control function schedules the Viterbi decoding attempts including the checksum validation in a power efficient manner. A Viterbi decoding is a method to decode convolutional codes, one among several. In the scope of this disclosure, it is possible to restrict to the term decoder only. It postpones the first decoding attempt to a point in time where the expected success probability is sufficiently large as determined by the redundancy estimation function. Without limiting the scope of the disclosure, a threshold based approach is suitable where the first decoding attempt is made only after the expected success probability exceeds a pre-defined threshold.

Summarizing the inventive method, one can say that the power consumption of the NB-IoT device's modem can be reduced over state-of-the-art approaches by estimating the redundancy (number of sub-frame repetitions) required for successful reception. By controlling the reception of specific sub-frames, power consumption can be reduced even further.

BRIEF DESCRIPTION OF THE DRAWINGS

The disclosure will be explained in more detail using exemplary embodiments.

The appended drawings show

DETAILED DESCRIPTION

As explained and discussed above, FIG. 2 illustrates the state-of-the-art approaches "complete reception" and "early termination".

In the following, FIG. 2 shows several use cases (a) to (d), which uses the inventive NPDSCH reception scenario to illustrate the benefits of the proposed predictive reception.

Within use case (a) shown in FIG. 2, the NB-IoT device's modem detects excellent channel conditions, so that the redundancy estimation function decides to receive a single transmission of each sub-frame (A,B,C) of the rate matched block. The remaining sub-frames (shown with white background in the figure) do not need to be received on the NB-IoT device's modem side. Depending on the NB-IoT device's modem implementation, however, some parts of the radio and/or baseband (like PLL) might need to remain powered to allow phase coherent reception across all sub-frames.

Within use case (b), the redundancy estimation function finds a slightly worse wireless channel and, thus, decides to receive one additional repetition of each sub-frame of the rate matched block. In use cases (a) and (b), the proposed scheme reduces the reception time from 24 ms (or 12 ms with early termination) to 3 ms and 6 ms, respectively. The reduced reception time lowers the power consumption of the NB-IoT device's modem and, thus, prolongs the battery life-time of the device (hence the UE).

The repetition reception control function decides to group the reception of requested sub-frames in a more efficient manner as shown in use case (c) of FIG. 2. In contrast to use case (b), the parts B and C of the rate matched block can be received continuously ensuring efficient power-saving.

Using the proposed redundancy estimation function, the NB-IoT device's modem now has an estimation for the first decoding attempt of the rate matched block. As shown in use case (d), for example, the redundancy estimation function decides to receive six repetitions of each sub-frame. In that case, another power-saving aspect of the proposed procedures is that the repetition reception control function will schedule the first decoding attempt only after having received sufficient repetitions of each sub-frame, and not immediately after the first repetition cycle since the success probability of such an early attempt is considered low. By reducing the number of unsuccessful decoding attempts, the NB-IoT device's modem can save power additionally.

The following FIG. 3 to FIG. 6 provide more details about the proposed procedure.

FIG. 3 shows the information flow within the redundancy estimation function as part of the inventive method. Input into this function is the information about the downlink resource assignment and repetition number in the form of downlink control information (DCI Format N1) which is received in Narrowband Physical Downlink Control Channel (NPDCCH). Furthermore, the function has full access to the NB-IoT device's modem operational state, e.g. it might retrieve current and past channel state (as determined by the modem) as well as soft-buffer state represented by log likelihood ratios (LLR). LLRs represent the reliability of the soft-bits. The function outputs the expected number of repeated sub-frames to be received for a successful decoding of the NPDSCH. So, the purpose of the redundancy estimation function is the estimation of the required level of redundancy to successfully receive a unicast NPDSCH transmission.

Figure 4:
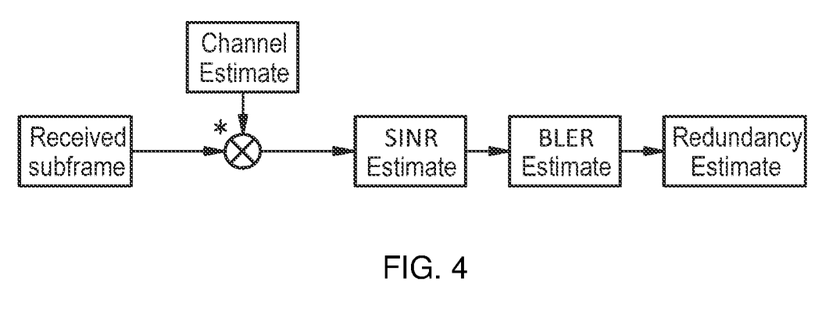
FIG. 4 Open-Loop redundancy estimation function.

FIG. 4 shows a first example of the redundancy estimation function in an open-loop fashion using channel quality estimation. In that case, the NB-IoT device's modem is using the narrow-band reference symbols (NRS) for estimation of the signal to interference and noise ratio (SINR). Using the estimated SINR as well as the target code rate from the DCI, a table-lookup based approach can be employed to determine the required number of repetitions. The open-loop approach has low complexity and the output is available already within the decoding process.

Figure 5:
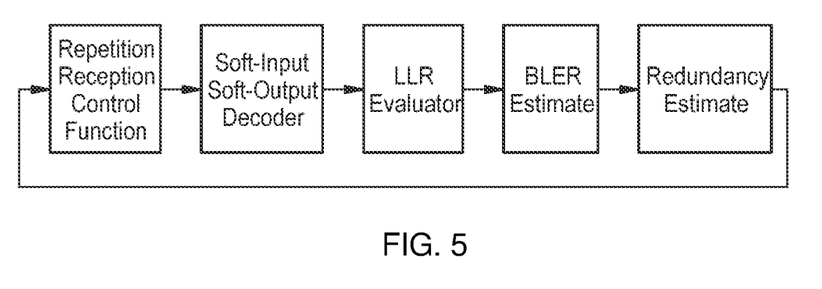
FIG. 5 Closed-loop redundancy estimation function.

FIG. 5 shows a second example of the redundancy estimation function in a closed-loop fashion. Within the closed-loop function, the soft-bit output of the receiver is used as the input for the repetition reception control function. The closed-loop redundancy estimation function's LLR evaluator evaluates the soft-bit output from the decoder and maps it to a corresponding block error rate (BLER). Based on the estimated block error rate, the function decides upon the additional number of repetitions to receive for each sub-frame of the rate matched block. The output of the closed-loop approach is available later; however, the estimation quality is higher.

Closed- and open-loop redundancy estimation can be combined to hybrid approaches.

Figure 6:
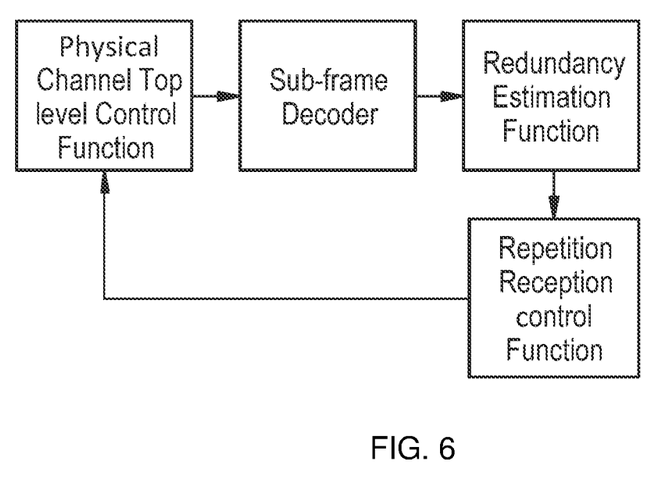
FIG. 6 Inventive repetition reception control function.

FIG. 6 shows the inventive repetition reception control function. With predictive reception of repetitions, a degree of freedom arises in the scheduling of repetitions to be received, since only a sub-set of all repetitions is required. The repetition reception control function schedules the repetition reception in an efficient manner based on the input of the redundancy estimation function to minimize the RF reprogramming actions. There is a feedback loop between both functions to incrementally refine and adapt.

Furthermore, the repetition reception control function schedules the Viterbi decoding attempts including the checksum validation in a power efficient manner. It postpones the first decoding attempt to a point in time where the expected success probability is sufficiently large as determined by the redundancy estimation function. Without limiting the scope of the disclosure, a threshold based approach is suitable where the first decoding attempt is made only after the expected success probability exceeds a pre-defined threshold.

For the sake of illustration, the discussed embodiments of the proposed method use NPDSCH receptions of the initial Hybrid Automatic Repeat reQuest (HARQ) transmission. Nevertheless, the inventive method can be applied to the following use cases, as well:

Firstly, retransmission of unicast NPDSCH; Retransmission is the case where the transport block is transmitted again by the eNodeB (base station) if a decoding failure occurs at the UE and a NACK (negative acknowledgement) is reported to the eNodeB.

Secondly, paging use case: NPDSCH with Paging Channel/Paging Control Channel (PCH/PCCH) content; Paging is the case where a downlink data is pending for the UE and the network broadcasts the information to the cell. The UE monitors paging channel periodically to receive the paging.

Thirdly, SC-PTM multi-cast; SC-PTM refers to single cell point-to-multipoint transmission for multi-cast transmission. An NB-IoT system may use SC-PTM service for firmware update of a group of devices. Data is carried in NPDSCH and identified by a Group Radio Network Temporary Identifier (G-RNTI). UE receives the data in a similar way as for specific unicast transmission but using G-RNTI.

What is claimed is:

1. A method for predictive reception of physical layer downlink repetitions in NarrowBand Internet-of-things (NB-IoT) user equipment (UE), the method comprising the following steps:

estimating an expected number of repeated sub-frames required for a successful reception of a current encoded and in sub-frames rate-matched downlink transmission from a base station to a user equipment by applying a redundancy estimation function, wherein the redundancy estimation function uses a downlink control information (DCI) Format N1, which is transmitted in Narrowband Physical Downlink Control Channel (NPDCCH) from the base station to the user equipment; and using the estimated expected number of repeated sub-frames as input of a repetition reception control function, wherein the repetition reception control function schedules and postpones the repetition reception and a decoding attempt of the downlink transmission to a point in time where an expected success probability is reached according to the redundancy estimation function;

wherein a feedback-loop between the redundancy estimation function and the repetition reception control function is used for refining and adapting the predictive reception of physical layer downlink repetitions in NB-IoT UE; wherein the redundancy estimation function is realized in an open-loop fashion, wherein in the open-loop fashion the UE uses received sub-frames from the base station and narrow-band reference symbols (NRS) for estimation of a signal to interference and noise ratio (SINR), whereas the estimated SINR and a target code rate from the DCI is used to determine the required number of repeated sub-frames; or the redundancy estimation function is realized in a closed-loop fashion, wherein in the closed-loop fashion the UE uses a soft-bit output of its soft-buffer as an input of the redundancy estimation function, whereas a log likelihood ratio (LLR) evaluator of the redundancy estimation function evaluates the soft-bit output and maps it to a corresponding block error rate (BLER).

2. The method for predictive reception of physical layer downlink repetitions in NB-IoT UE according to claim 1, wherein the DCI Format N1 comprises information about a downlink resource assignment and repetition number.

3. The method for predictive reception of physical layer downlink repetitions in NB-IoT UE according to claim 2, wherein the DCI Format N1 is used to indicate downlink scheduling information for the UE, and the repetition number refers to a 3-bit field in DCI Format N1 indicating a number of repetitions of rate matched block.

4. The method for predictive reception of physical layer downlink repetitions in NB-IoT UE according to claim 1, wherein the redundancy estimation function has full access to the UE's operational state, especially retrieving current and past channel states, soft-buffer state represented by log likelihood ratios (LLRs).

5. The method for predictive reception of physical layer downlink repetitions in NB-IoT UE according to claim 1, wherein the redundancy estimation function is realized in a closed-loop fashion, wherein in the closed-loop fashion the UE uses a soft-bit output of its soft-buffer as an input of the redundancy estimation function, whereas a log likelihood ratio (LLR) evaluator of the redundancy estimation function evaluates the soft-bit output and maps it to a corresponding block error rate (BLER), wherein the LLR evaluator is a function that estimates signal level from log-likelihood ratios (LLRs) of each bit, estimates bit error rate (BER) and using a look-up table (LUT), maps BER to a corresponding block error rate (BLER) for a given block size.

6. The method for predictive reception of physical layer downlink repetitions in NB-IoT UE according to claim 5, wherein the BER is defined as a ratio of a number of erroneous decoded blocks to a total number of transmitted blocks.

7. The method for predictive reception of physical layer downlink repetitions in NB-IoT UE according to claim 1, wherein for the repetition reception control function a threshold value is pre-defined, at which a first decoding attempt is made.

8. The method for predictive reception of physical layer downlink repetitions in NB-IoT UE according to claim 7, wherein the repetition reception control function schedules Viterbi decoding attempts including checksum validation in a power efficient manner.

9. The method for predictive reception of physical layer downlink repetitions in NB-IoT UE according to claim 8, wherein the repetition reception control function postpones the first decoding attempt to a point in time where the expected success probability is sufficiently large as determined by the redundancy estimation function.

10. The method for predictive reception of physical layer downlink repetitions in NB-IoT UE according to claim 7, wherein the redundancy estimation function decides to receive six repetitions of each sub-frame, and the repetition reception control function schedules the first decoding attempt only after having received sufficient repetitions of each sub-frame.

11. The method for predictive reception of physical layer downlink repetitions in NB-IoT UE according to claim 7, wherein the repetition reception control function acts upon an input of the redundancy estimation function and collects required number of repetitions of each sub-frame of rate matched block.

12. The method for predictive reception of physical layer downlink repetitions in NB-IoT UE according to claim 7, wherein the repetition reception control function schedules decoding attempts and collects further redundancy in case of unsuccessful decoding.

13. The method for predictive reception of physical layer downlink repetitions in NB-IoT UE according to claim 1, wherein the downlink transmission comprises all data that should be transmitted from the base station to the NB-IoT UE over Narrowband physical downlink shared channel (NPDSCH).

14. The method for predictive reception of physical layer downlink repetitions in NB-IoT UE according to claim 13, wherein the NPDCCH indicates for which NB-IoT UE there is data in the NPDSCH, where to find them and how often they are repeated.

15. The method for predictive reception of physical layer downlink repetitions in NB-IoT UE according to claim 1, wherein the expected success probability is a mean probability of successfully decoding a transport block.

16. A method for predictive reception of physical layer downlink repetitions in NarrowBand Internet-of-things (NB-IoT) user equipment (UE), the method comprising the following steps:

estimating an expected number of repeated sub-frames required for a successful reception of a current encoded and in sub-frames rate-matched downlink transmission from a base station to a user equipment by applying a redundancy estimation function, wherein the redundancy estimation function uses a downlink control information (DCI) Format N1, which is transmitted in Narrowband Physical Downlink Control Channel (NPDCCH) from the base station to the user equipment; and using the estimated expected number of repeated sub-frames as input of a repetition reception control function, wherein the repetition reception control function schedules and postpones the repetition reception and a decoding attempt of the downlink transmission to a point in time where an expected success probability is reached according to the redundancy estimation function;

wherein a feedback-loop between the redundancy estimation function and the repetition reception control function is used for refining and adapting the predictive reception of physical layer downlink repetitions in NB-IoT UE; wherein the redundancy estimation function is realized in a hybrid approach which combines an open-loop fashion and a closed-loop fashion;

wherein in the open-loop fashion the UE uses received sub-frames from the base station and narrow-band reference symbols (NRS) for estimation of a signal to interference and noise ratio (SINR), whereas the estimated SINR and a target code rate from the DCI is used to determine the required number of repeated subframes, and in the closed-loop fashion the UE uses a soft-bit output of its soft-buffer as an input of the redundancy estimation function, whereas a log likelihood ratio (LLR) evaluator of the redundancy estimation function evaluates the soft-bit output and maps it to a corresponding block error rate (BLER).

* * * * *